(12) United States Patent
Gallegos-Lopez et al.

(10) Patent No.: US 7,719,138 B2
(45) Date of Patent: May 18, 2010

(54) TWO-SOURCE SERIES INVERTER

(75) Inventors: Gabriel Gallegos-Lopez, Torrance, CA (US); Milun Perisic, Torrance, CA (US); George John, Cerritos, CA (US); Gregory S. Smith, Woodland Hills, CA (US); Silva Hiti, Redondo Beach, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 164 days.

(21) Appl. No.: 11/853,202

(22) Filed: Sep. 11, 2007

(65) Prior Publication Data

US 2009/0066163 A1    Mar. 12, 2009

(51) Int. Cl.
*H02J 1/00*    (2006.01)

(52) U.S. Cl. .......................................... 307/43; 307/64
(58) Field of Classification Search .................... 307/64
See application file for complete search history.

(56) References Cited

U.S. PATENT DOCUMENTS

| | | | | |
|---|---|---|---|---|
| 3,614,461 A * | 10/1971 | Speer et al. | ................... | 307/64 |
| 4,763,013 A * | 8/1988 | Gvoth, Jr. et al. | ............. | 307/66 |
| 5,148,043 A * | 9/1992 | Hirata et al. | .................. | 307/66 |
| 5,198,970 A * | 3/1993 | Kawabata et al. | ............. | 363/37 |
| 5,234,319 A * | 8/1993 | Wilder | ......................... | 417/40 |
| 5,612,580 A * | 3/1997 | Janonis et al. | ................ | 307/64 |
| 5,633,539 A * | 5/1997 | Tassitino, Jr. | ................ | 307/64 |
| 5,841,644 A * | 11/1998 | Lipo et al. | .................... | 363/37 |
| 5,939,799 A * | 8/1999 | Weinstein | .................... | 307/64 |
| 5,969,436 A * | 10/1999 | Chalasani et al. | ............. | 307/64 |
| 6,055,163 A * | 4/2000 | Wagner et al. | ................ | 363/37 |
| 6,184,593 B1 * | 2/2001 | Jungreis | ....................... | 307/64 |
| 6,275,392 B1 * | 8/2001 | Streicher et al. | .............. | 363/35 |
| 6,295,215 B1 * | 9/2001 | Faria et al. | .................... | 363/37 |
| 6,369,461 B1 * | 4/2002 | Jungreis et al. | ............... | 307/46 |
| 6,654,261 B2 * | 11/2003 | Welches et al. | ............... | 363/41 |
| 6,838,925 B1 * | 1/2005 | Nielsen | ....................... | 327/391 |
| 6,958,550 B2 * | 10/2005 | Gilbreth et al. | ............... | 290/52 |
| 7,023,109 B2 * | 4/2006 | Amano | ......................... | 307/64 |
| 7,050,312 B2 * | 5/2006 | Tracy et al. | ................... | 363/37 |
| 7,117,044 B2 * | 10/2006 | Kocher et al. | .................. | 700/34 |
| 2003/0043596 A1 * | 3/2003 | Pai et al. | ....................... | 363/16 |
| 2007/0170910 A1 * | 7/2007 | Chang et al. | ............. | 324/158.1 |

* cited by examiner

*Primary Examiner*—Stephen W Jackson
*Assistant Examiner*—Adi Amrany
(74) *Attorney, Agent, or Firm*—Ingrassia Fisher & Lorenz, P.C.

(57) ABSTRACT

Systems and methods are disclosed for a two-source series inverter. The systems and methods combine operation of a first voltage source and a second voltage source in series powering a novel voltage combining arrangement and a conventional inverter via a switch configuration to power a load. The switch configuration is controlled by a plurality of control signals generated by a controller based on a variety of control modes, and feedback signals.

12 Claims, 3 Drawing Sheets

TWO-SOURCE SERIES INVERTER

TECHNICAL FIELD

Embodiments of the present invention relate generally to electric power converters, and more particularly relate to DC-AC inverters.

BACKGROUND

An inverter is an electronic circuit for converting direct current (DC) to alternating current (AC). Inverters are used in a wide range of applications, from small uninterruptible power supplies for a computer to large electric power transport utility applications, and variable speed industrial drives. A common application is for DC voltage source utilization such as a system designed to provide 115 volts AC from the 12 volts DC source provided in an automobile, the 12 volts DC source is first boosted over 200 V DC by a DC/DC converter, and then an inverter converts the high DC voltage to 115 volts AC. An inverter supplies AC power to operate equipment that is normally supplied from a power line or to power an AC electric motor. Inverters are also used to provide a source of AC power from fuel cell or photovoltaic solar cell power supplies. Uninterruptible power supplies are another type of application. Uninterruptible power supplies may use batteries to store power and an inverter to supply AC power from the batteries when power lines are not functioning or unavailable. When the power lines are restored, the batteries are recharged. High-voltage direct current power transmission is another application, where AC power is rectified into a high voltage DC and transmitted to another location. At the receiving location, an inverter converts the DC back to AC.

The term inverter has its origin from electromechanical converters. Historically, DC-to-AC power conversion was accomplished using electromechanical rotary converters coupling an AC electric motor to a DC electric generator in order to convert an AC input into a DC output. If the connections to a converter are inverted, the input is DC and the output is AC, so the historical inverted converter gave rise to the term inverter.

These early electromechanical devices were replaced with vacuum and gas filled tube switches in inverter circuits. Because they have higher voltage and current ratings, transistor semiconductor switches that can be turned on and turned off by means of control signals have become the preferred switching components for use in inverter circuits. In particular, the insulated gate bipolar transistors (IGBTs) are, at present, the most commonly used transistors for high current application such as for hybrid vehicles.

Three-phase is a common type of AC that can be produced by an inverter and used for electric power applications. It is a type of multi-phase system used to power motors, transformers, and many other devices. Three-phase has properties that make it very desirable in electric power systems: The phase currents sum to zero in a properly balanced load making it possible to eliminate the AC neutral conductor; power transfer into a balanced load is constant reducing generator and motor vibrations; and three-phase systems can produce a magnetic field that rotates in a specified direction, which simplifies the design of electric motors. Three is the lowest phase order with these properties.

An important type of three-phase load is an electric motor. A three-phase electric motor has a simple design, high torque at low RPM, and high efficiency. Three-phase motors are used for pumps, fans, blowers, compressors, electric and diesel-electric locomotives and many other kinds of motor-driven equipments. Three-phase motors are more compact, less expensive, vibrate less, last longer than a single-phase motor of the same power rating, and are subsequently preferred over single-phase for motors above 10 HP (7.5 kW). Hybrid, fuel cell, and electric vehicles often use three-phase motors because their high starting torque can be used to accelerate a vehicle to a useful speed. A three-phase motor can also be used as a generator for regenerative braking.

Hybrid, fuel cell, and electric vehicles often have more than one source of DC power. For example, these vehicles may use electric batteries, ultra-capacitors, fuel cells, and fuel powered generators, all producing DC power. Moreover, the different sources will often have different voltages requiring voltage conversion to combine their electrical voltages. A traditional approach is to use a DC/DC converter, which is a complex and expensive piece of equipment.

Accordingly, it is desirable to have a simple system for using two sources for a three-phase inverter without using a DC/DC converter. Furthermore, other desirable features and characteristics will become apparent from the subsequent detailed description and the appended claims, taken in conjunction with the accompanying drawings and the foregoing technical field and background.

BRIEF SUMMARY

Systems and methods are disclosed for a two-source series inverter. The systems and methods combine operation of a first voltage source with a second voltage source to power a switching configuration to power a three-phase load. The switching configuration is controlled by a plurality of control signals generated by a controller based on a variety of control modes.

The system has a first voltage source and a second voltage source coupled in series to a voltage combiner. The voltage combiner uses a structure of diodes, capacitors and a switch to combine the voltages of the first and second voltage sources to drive an inverter to produce AC outputs. A multi-phase load may be coupled to the inverter AC outputs. A controller is coupled to the voltage combiner and the inverter, and is configured to control current flow through the voltage combiner and the inverter.

An operating method as described herein begins by determining a control mode for a controller having a plurality of control signals, and feedback signals. The method then operates a voltage combiner concurrently with an inverter. The voltage combiner controls flow of a first electrical current from a first electrical voltage source and a second electrical current from a second electrical voltage source via a switch based on a control signal. The inverter produces AC outputs for powering a load based on the plurality of control signals, and feedback signals. The method then delivers power to the load via the inverter.

BRIEF DESCRIPTION OF THE DRAWINGS

Embodiments of a two-source series inverter will hereinafter be described in conjunction with the following drawing figures, wherein like numerals denote like elements.

DETAILED DESCRIPTION

Figure 1:
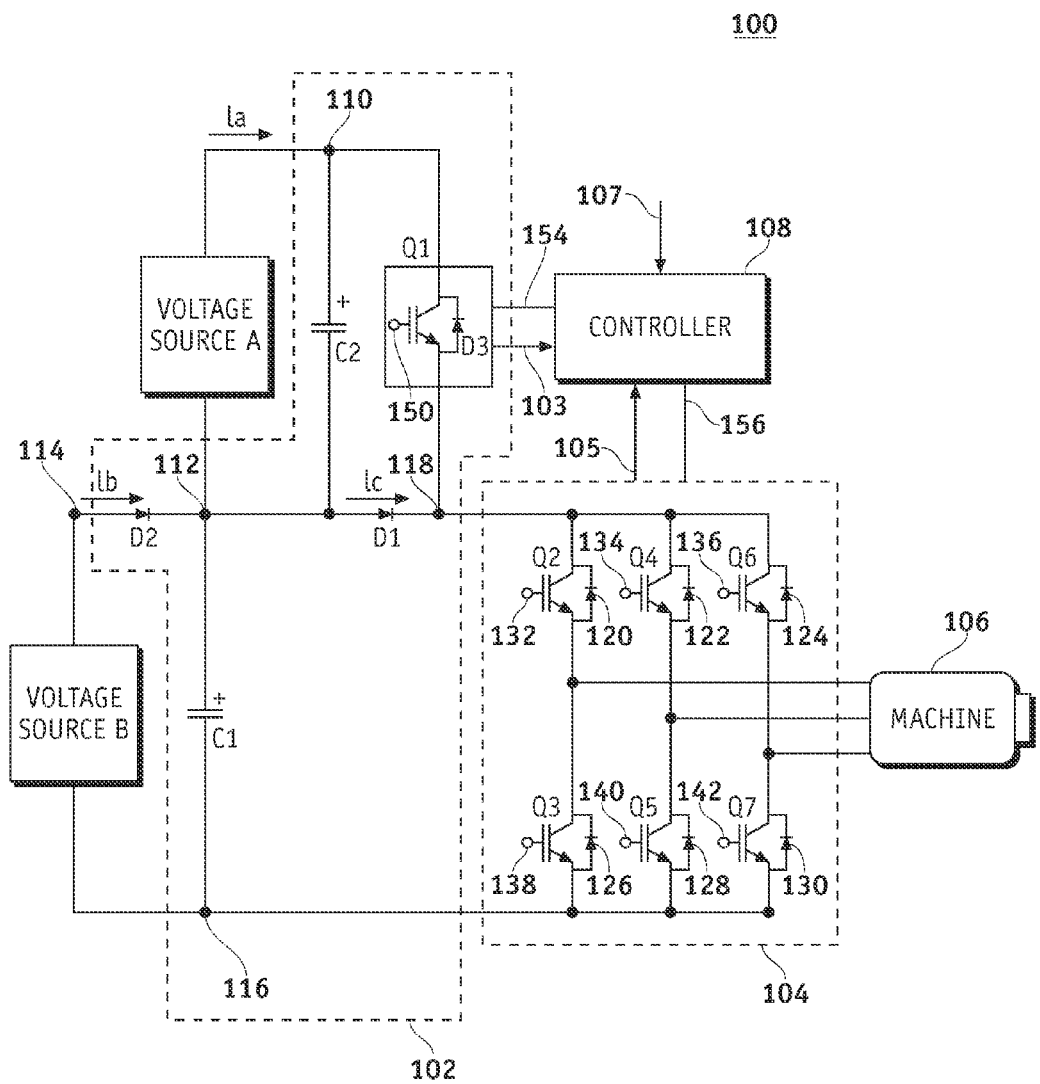
FIG. 1 is a schematic representation of an embodiment of a two-source series inverter system.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of vehicle applications and that the system described herein is merely one example embodiment of the invention.

For the sake of brevity, conventional techniques and components related to vehicle electrical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode).

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown in FIGS. 1-2 depict example arrangements of elements, additional intervening elements, devices, features, or components may be present in an embodiment of the invention (assuming that the functionality of the system is not adversely affected).

Embodiments of the invention are described herein in the context of one practical non-limiting application, namely, a two-source series inverter system for a vehicle with a three-phase electric motor. In this context, the example technique is applicable to operation of a system suitable for a vehicle. Embodiments of the invention, however, are not limited to such vehicle applications, and the techniques described herein may also be utilized in other power conversion systems.

Three-phase inverters are used for variable-frequency drive applications. There are many different power circuit topologies and control strategies used in inverter designs. Different design approaches are used to address various issues that may be more or less important depending on the way that the inverter is intended to be used.

Figure 2:
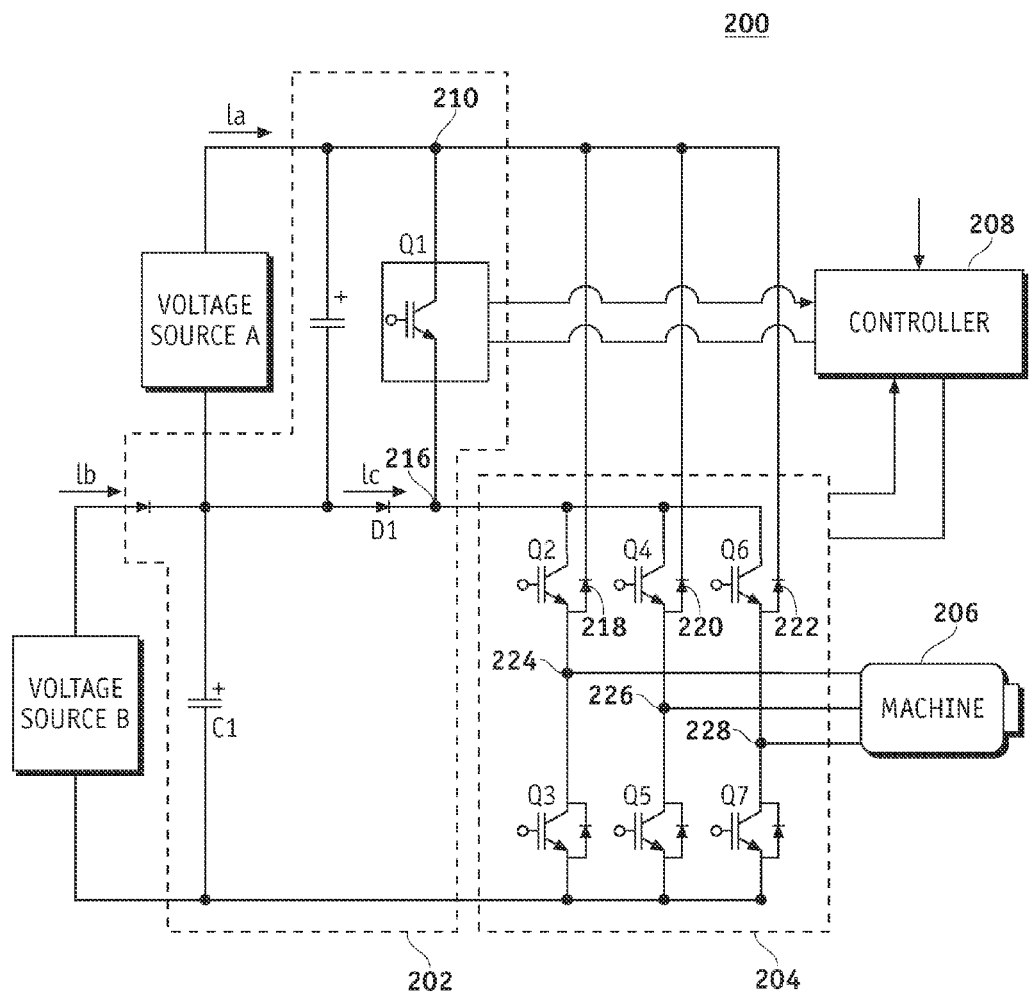
FIG. 2 is a schematic representation of another embodiment of a two-source series inverter system.

FIG. 1 is a schematic representation of a two-source series inverter system 100 for a vehicle that is suitably configured to perform the operations described in detail herein. System 100 is suitable for use with a vehicle having an electric traction motor. A practical two-source series inverter system 100 may include a number of electrical components, circuits and controller units other than those shown in FIG. 1. Conventional subsystems, features, and aspects of the two-source series inverter system 100 will not be described in detail herein. For this example embodiment, as shown in FIG. 1, the system 100 may generally include: a voltage source A, a voltage source B, a voltage combiner 102, an inverter 104, a machine 106 or other load, and a controller 108.

The voltage source A is configured to support the operation of a hybrid vehicle or an electric vehicle. The voltage source A has, a first pole or terminal connected to node 110 and a second pole or terminal connected to node 112. The nodes 110 and 112 are, without limitation, a positive reference potential and a negative (ground) reference potential respectively. The voltage source A may be connected in this manner to the voltage combiner 102, which in turn provides power to the inverter 104. The voltage source A is configured to provide an electrical voltage and current to the voltage combiner 102 via node 110 and node 112. The electrical voltage provided by the voltage source A is a high DC voltage, which may be in the neighborhood of a couple hundred volts for this application. The voltage source A may be, for example, a generator, fuel cell, batteries (such as lead acid, nickel metal hydride, or lithium ion batteries), or ultra-capacitors.

The voltage source B is also configured to support the operation of a hybrid vehicle. The voltage source B has a first pole or terminal connected to node 114 and a second pole or terminal connected to node 116. The nodes 114 and 116 are, without limitation, a positive reference potential and a negative (ground) reference potential respectively. The voltage source B may be connected in this manner to the voltage combiner 102, which in turn provides power to the inverter 104. The voltage source B is configured to provide an electrical voltage and current to the voltage combiner 102 via node 114 and node 116. The electrical voltage provided by the voltage source B is a high DC voltage, which may be in the neighborhood of a couple hundred volts for this application. The voltage source B may be, for example, a generator, fuel cell, batteries (such as lead acid, nickel metal hydride, or lithium ion batteries), or ultra-capacitors.

The voltage combiner 102 controls flow of electrical currents from voltage source A and voltage source B based on a plurality of control signals 154, and feedback signals 103. The voltage combiner 102 includes, without limitation: controlled switch Q1, gate contact 150, capacitors C1/C2, and diodes D1/D2/D3. The voltage combiner 102 has a first input at node 110 coupled to the first pole of voltage source A, and a second input at node 112 coupled to the second pole of voltage source A. The voltage combiner 102 also has a third input at node 114 coupled to the first pole of voltage source B, and a fourth input at node 116 coupled to the second pole of voltage source B. This description refers to these "inputs" of voltage combiner 102 because in most operating conditions current will flow into the inputs, however under some operating conditions, such as regenerative braking, current may flow in a negative direction (recharge current). The voltage combiner 102 also has DC outputs arranged in system 100 as follows: a first output node 118, and a second output node 116.

The illustrated embodiments employ IGBT controlled switches. In practice, however, other controlled switch types may be utilized. The controlled switch Q1 is connected between node 110 and node 118. In this embodiment the collector of controlled switch Q1 corresponds to node 110, and the emitter of controlled switch Q1 corresponds to node 118. The current capacity of the controlled switch depends on power rating of the machine 106 and may vary for each controlled switch instance. In this example embodiment, the current capacity is the same for all controlled switches. Gate contact 150 is coupled to and controlled by the controller 108. The gate contact 150 is configured to allow current flow or block current flow in response to the control signal from the controller 108. The voltage source A can be recharged through diode D3, which allows flow of a recharging current from the three-phase load to the voltage source A, wherein a recharging current is a current out of the three-phase motor operating in generator mode. The controlled switch Q1 controls the current flow from the voltage source A. In this regard, a need for a DC/DC converter is eliminated. The controlled switch Q1 is switched on and off by a control signal from the controller 108 in order to control power flow (current flow) from the voltage source A to inverter 104, which converts DC into an AC suitable for use by the machine 106. The controlled switch Q1 in conjunction with inverter 104 controls and provides power to the machine 106. The controlled switch Q1 determines if power/current flows from sources A and B in series, only from source A and C1, or only from source B.

Capacitor C1 is included in voltage combiner 102 to provide power conditioning and to smooth voltage surges of the inverter. The capacitor C1 has a first pole connected to node 112 and a second pole connected to node 116. The capacitor C1 is included to buffer electrical energy between the voltage source B and the output node 118. In practice, capacitor C1 may be realized as an ultra-capacitor or as any suitable capacitance element. Capacitor C1 may also represent the capacitance that will naturally exist in other components of the hybrid vehicle such as, for example without limitation, an active electrical bus, and/or power electronics. Each of these devices may contain capacitors, power output stages, etc. The capacitance of capacitor C1 may vary from one application to another, depending on the power required by the machine 106. In this example embodiment, capacitor C1 has a capacitance of about 10,000 microfarads.

Capacitor C2 is included in voltage combiner 102 for the same reasons as capacitor C1. The capacitor C2 has a first pole connected to node 110 and a second pole connected to node 112. Note that the capacitor C2 is coupled in parallel with the voltage source A. Generally, the above description of capacitor C1 also applies to capacitor C2.

Diodes D1/D2/D3 control the direction of current flow in voltage combiner 102. Diode D1 is connected between node 112 and node 118. Diode D1 allows current flow in only one direction—from node 112 to node 118, but blocks current flow from node 118 to node 112. Thus, diode D1 enables current to flow from the voltage source B or capacitor C1 to inverter 104 and to machine 106, but not from inverter 104 to voltage source B or capacitor C1. Diode D2 is connected between node 112 and node 114, and allows current flow in only one direction—from node 114 to node 112. Thus, diode D2 enables current to flow from the voltage source B to capacitor C1. Diode D3 is connected between node 110 and node 118, and allows current flow in only one direction—from node 118 to node 110. Thus, diode D3 enables a recharge current to flow from inverter 104 to voltage source A, and C1 in series.

The inverter 104 is configured to produce AC outputs for a load/machine based on the plurality of control signals 156, and feedback signals 105. The inverter 104 by itself is a common architecture for a single voltage source inverter, and may be a three-phase or multi-phase inverter. For this example, the inverter 104 is an inverter circuit that includes: controlled switches Q2-Q7, diodes (reference numbers 120, 122, 124, 126, 128, and 130), and gate contacts (reference numbers 132, 134, 136, 138, 140, and 142). The inverter 104 has a first input connected to node 118 and a second input connected to node 116. The inverter 104 also has a set of AC outputs connected as follows: a first AC output corresponding to node 144, a second AC output corresponding to node 146, and a third AC output corresponding to node 148. The respective collectors and emitters of controlled switches Q2-Q7 are connected as follows in this embodiment: Q2 is between node 118 and node 144, Q4 is between node 118 and node 146, Q6 is between node 118 and node 148, Q3 is between node 116 and node 144, Q5 is between node 116 and node 146, and Q7 is between node 116 and node 148.

The current capacity of the controlled switches depends on the power rating of the machine 106 and it may vary for each controlled switch. In this example embodiment, the current capacity is the same for all controlled switches of controlled switches Q2-Q7. Since most loads contain inductance, diodes (reference numbers 120, 122, 124, 126, 128, and 130) are connected across each controlled switch to provide bidirectional current flow. In this regard, each of the controlled switches Q2-Q7 contains a respective diode between its emitter and collector to allow a negative current from the load to charge the voltage source. In practice, machine 106 can recharge the voltage source A (assuming voltage source A is a rechargeable device) during regenerative braking of a vehicle. During regenerative braking from the machine 106, the inputs may have negative current flow (recharge current). This embodiment handles such current flow using the gate contacts 132, 134, 136, 138, 140, and 142. In this regard, the gate contacts are coupled to and controlled by the controller 108 (for the sake of clarity, the individual control signals from controller 108 to each gate contact are not depicted in FIG. 1). The controlled switches Q2-Q7 are configured to allow current flow or block current flow in response to the voltage of the control signals from the controller 108.

The machine 106 is coupled to the AC output nodes 144/146/148 of controlled switches Q2-Q7. The machine 106 for this example includes an AC electric machine that provides power or additional power to a powertrain, and regenerative braking. AC electric machine are often used for this application because they provide high torque under load, and high power. The machine 106 is a AC electric machine, and may be, without limitation, an induction or synchronous three-phase or multi-phase AC electric machine.

The voltage combiner 102 and inverter 104 arrangement is actuated by a suitably configured controller 108, which can be coupled to the arrangement 102/104 via control inputs 154/156 generated by the controller 108 based on a variety of control modes and feedback signals 103/105. The controller 108 may be implemented as part of a vehicle computing module, a centralized vehicle processor, a subsystem computing module devoted to the switch arrangement, or the like. In operation, the controller 108 receives command signals 107 and feedback signals 103/105 and controls the actuation of the controlled switches in accordance with the current state of the vehicle or required power flow, e.g., whether the regenerative braking mode or the normal operating mode is active. The controlled switches Q1-Q7 are activated by the controller 108 based on the predetermined pattern of control signals. In this regard, a controlling pattern for the control signals is calculated for activating the controlled switches Q1-Q7. Each switch may be activated via its respective control inputs depending on a predetermined duty cycle as explained below in the context of FIG. 3. The controller 108 is generally a software-controlled device. Under normal conditions, it operates the controlled switches Q1-Q7 to produce a three-phase AC current during vehicle operation.

FIG. 2 is a schematic representation of another embodiment of a two-source series inverter system 200, which is suitable for a hybrid vehicle or electric vehicle. System 200 is suitable for use with a vehicle having an electric traction motor. A practical two-source series inverter system 200 may include a number of electric components, circuits and controller units other than those shown in FIG. 2. Conventional subsystems, features, and aspects of the two-source series inverter system 200 will not be described in detail herein. System 200 has a structure that is similar to system 100, and common features, functions, and elements will not be redundantly described here. For this example embodiment, as shown in FIG. 2, the system 200 may generally include: a voltage source A, a voltage source B, a voltage combiner 202, a three phase inverter 204, a machine 206 or other load, and a controller 208.

The afore mentioned components function in the same manner as those in system 100 with the exception that system 200 does not have the anti-parallel diode D3 of controlled switch Q1. Instead, the voltage source A is connected to the AC outputs of the three-phase inverter via diodes 218/220/222 to regulate current flow between the AC outputs 224/226/202 and the voltage source A. In this embodiment, diode 218 is connected between node 210 and node 224, diode 220 is connected between node 210 and node 226 and diode 222 is connected between node 210 and node 228. Note that node 210 corresponds to the collector of controlled switch Q1, node 224 corresponds to the emitter of controlled switch Q2, node 226 corresponds to the emitter of controlled switch Q4, and node 228 corresponds to the emitter of controlled switch Q6.

As compared to system 100, in this embodiment, diodes 218/220/222 allow a reverse current from the machine 206 for regenerative charging of voltage source A. The connection of the voltage source A directly to the diodes 218/220/222 replaces diode D3 in system 100 for the purpose of allowing a recharge current to flow from machine 106 to voltage source A. The advantage of this embodiment as compared to system 100 is that system 200 may allow to recover more current from the machine 206 since it forces freewheeling diode currents to go to the voltage source A, and may reduce cost since it requires fewer circuit elements by removing diode D3.

Figure 3:
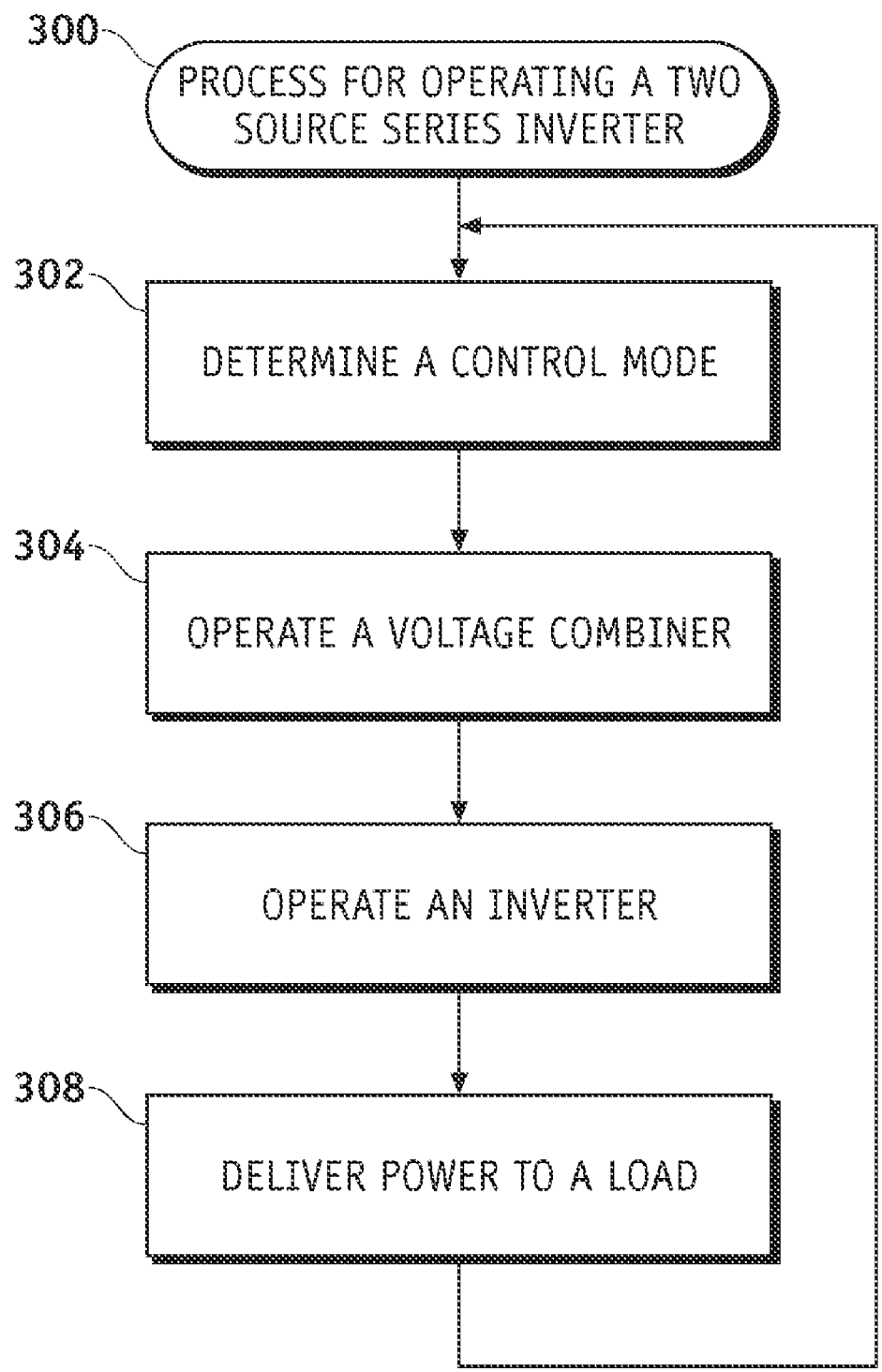
FIG. 3 is a flowchart illustrating an embodiment of a two-source series inverter system operating process.

FIG. 3 is a flowchart illustrating a two-source series inverter operation process 300 for an electric, hybrid electric, or fuel cell vehicle that may be performed by systems 100-200 as described above. Process 300 determines a control mode, operates a first switch, operates a first set of switches, and delivers power to a three-phase load. The various tasks performed in connection with process 300 may be performed by software, hardware, firmware, or any combination thereof. For illustrative purposes, the following description of process 300 may refer to elements mentioned above in connection with FIGS. 1-2. In practical embodiments, portions of process 300 may be performed by different elements of two-source series three-phase inverter systems 100-200, e.g., the voltage source A, the voltage source B, a voltage combiner 102, an inverter 104, and a controller 108.

Two-source series inverter operation process 300 begins by determining a control mode (task 302). The determination may be made by consideration of various status conditions, for example the RPM of the vehicle wheels, the power output of a gasoline engine, the RPM of the gasoline engine, an amount of charge in voltage source A, an amount of charge in the voltage source B, and various relations between these parameters. For example, if a vehicle is braking, then the machine should send power to the voltage sources if they are rechargeable, and determine a regeneration mode. In this regard, the control mode may allow positive current only from voltage source A, or voltage source B, or both, negative current flow only recharging voltage source A, and C1.

Next, process 300 operates a voltage combiner via first switch Q1 (task 304). Using the first set of switches in conjunction with the first switch and proper control, the current flow to the machine can be more precisely controlled. Switching Q1 with a pre-determined duty cycle controls power sharing flow from voltage sources A and/or B. The first set of switches and the first switch may be operated together or independently to provide power individually or in combination to the machine using Pulse Width Modulation (PWM). The frequency represented by the number of narrow pulses per second is called the switching frequency or carrier frequency. Combining the current from the first set of switches and the first switch allows for an even larger number of options since the voltage source A may have a different voltage from voltage source B, and the combination of switching patterns using, for example, switch Q1 in conjunction with the first set of switches Q2-Q7 will produce more varied levels of voltage.

Next, process 300 operates an inverter via the first set of switches Q2-Q7 (task 306). For this embodiment, each of the first set of switches are turned on and off by a Pulse Width Modulation (PWM) control signal. PWM provides control signals to operate the controlled switches to produce desired average output voltage. For example, if a 300 volt battery is connected to a device and the duty cycle is about 50% alternated between about 300 volts and about zero volts, the effective output voltage is about 50% of that of a constant 300 volts or 150 volts. Similarly, a duty cycle of X % may give an output voltage of X % of the voltage range and, accordingly, power available may be less than the total power. Various control modes may use the PWM signal to control the behavior of the two-source series inverter system 100 or system 200.

Power coming from each source is regulated by controlling the duty cycle of control signals sent to the switch Q1. The duty cycle is determined based on how much power is required from the voltage sources A and/or B. During motoring, when Q1 is turned on, voltage source A and B, or voltage source A and capacitor C1 are connected in series, which provide current (power) to the machine 106 via the inverter 104. When Q1 is turned off, voltage source B provides current (power) to the machine 106 via the inverter 104. During generating, the current (power) flows from the machine 106 to voltage source A, and capacitor C1 via the inverter 104 and diode D3 in one embodiment or via diodes 218, 220, and 222 in another embodiment. The duty cycle of switch Q1 is controlled by a controller as explained above in the context of FIG. 1. For example, with a duty cycle of 30%, switch Q1 is on 30% of the switching period.

Process 300 then delivers power to a load (task 308). For this embodiment, the load is an electric machine. Depending on the vehicle operation mode, the electric machine may be operating as a load receiving power from the voltage source A and the voltage source B through the inverter, or operating as a generator returning power to the first voltage source A through the first switch and the first switch set. The performance of the electric machine depends on the level of current flow from the switching of the first set of switches and the first switch as described above. Process 300 then leads back to task 302.

With this approach, the proposed topology has the flexibility to provide power from two different sources in series and that power flow can be controlled to charge one of the sources without compromising the power delivered to the machine.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A two-source series inverter system, the system comprising:
    a first voltage source;
    a second voltage source;
    an inverter having a first DC input, a second DC input, AC outputs, and first control inputs, wherein the AC outputs are configured to be coupled to a load, the load comprising an AC electric machine that provides power to a powertrain of a vehicle;
    a voltage combiner having a second control input, the voltage combiner being connected to the first DC input and the second DC input, and coupled to the first voltage source and the second voltage source; and
    a controller coupled to the first control inputs and the second control input, the controller being configured to receive first feedback signals and second feedback signals from the inverter and the voltage combiner respectively, and configured to control current flow through the voltage combiner and the inverter, wherein:
        the controller is configured to operate the inverter and the voltage combiner to control flow of a recharging current from the inverter through the voltage combiner to the first voltage source;
        a first electrical current flows from the first voltage source to the inverter through the voltage combiner; and
        a second electrical current flows from the second voltage source to the inverter through the voltage combiner.

2. The system according to claim 1, wherein the inverter comprises a single source multi-phase inverter.

3. The system according to claim 1, wherein the voltage combiner further comprises:
    a first node coupled to a first terminal of the first voltage source;
    a second node coupled to a second terminal of the first voltage source;
    a third node coupled to a first terminal of the second voltage source;
    a fourth node coupled to a second terminal of the second voltage source, and the second DC input of the inverter;
    a fifth node coupled to the first DC input of the inverter;
    a first capacitor connected between the first node and the second node;
    a second capacitor connected between the second node and the fourth node;
    a first diode connected between the second node and the third node;
    a second diode connected between the second node and the fifth node;
    a switch connected between the first node and the fifth node; and
    a third diode connected between the first node and the fifth node.

4. The system according to claim 1, wherein the voltage combiner further comprises:
    a first node coupled to a first terminal of the first voltage source;
    a second node coupled to a second terminal of the first voltage source;
    a third node coupled to a first terminal of the second voltage source;
    a fourth node coupled to a second terminal of the second voltage source, and coupled to the second DC input of the inverter;
    a fifth node coupled the first DC input of the inverter;
    a first capacitor connected between the first node and the second node;
    a second capacitor connected between the second node and the fourth node;
    a first diode connected between the second node and the third node;
    a second diode connected between the second node and the fifth node;
    a switch connected between the first node and the fifth node; and
    a plurality of diodes each connected between the first node and one of the AC outputs respectively.

5. The system according to claim 1, wherein the voltage combiner further comprises:
    a first node coupled to a first terminal of the first voltage source;
    a second node coupled to a second terminal of the first voltage source;
    a third node coupled to a first terminal of the second voltage source;
    a fourth node coupled to a second terminal of the second voltage source, and coupled to the second DC input of the inverter;
    a fifth node coupled the first DC input of the inverter;
    a first capacitor connected between the first node and the second node;
    a second capacitor connected between the second node and the fourth node;
    a first diode connected between the second node and the third node;
    a second diode connected between the second node and the fifth node;
    switch connected between the first node and the fifth node;
    a first connection between the first node and a first inverter diode in the inverter;
    a second connection between the first node and a second inverter diode in the inverter; and
    a third connection between the first node and a third inverter diode in the inverter.

6. The system according to claim 1, wherein the controller is further configured to control duty cycles of:
    the first control inputs; and
    the second control input.

7. The system according to claim 1, further comprising a multi-phase load coupled to the AC outputs.

8. The system according to claim 1, wherein the voltage combiner further comprises a plurality of diodes configured to limit the direction of current flow.

9. The two-source series inverter system of claim 1, wherein the voltage combiner comprises:
a first node coupled to a first terminal of the first voltage source;
a second node coupled to a second terminal of the first voltage source;
a third node coupled to a first terminal of the second voltage source;
a fourth node coupled to a second terminal of the second voltage source and the second DC input of the inverter;
a fifth node coupled to the first DC input of the inverter;
a first diode coupled between the second node and the third node, the first diode being configured to allow current flow from the third node to the second node; and
a switch coupled between the first node and the fifth node, wherein the first voltage source and the second voltage source are connected in series when the switch is turned on.

10. A two-source series inverter system, the system comprising:
a first voltage source;
a second voltage source;
an inverter having a first DC input, a second DC input, AC outputs, and first control inputs, wherein the AC outputs are configured to be coupled to a load;
a voltage combiner connected to the first DC input and the second DC input, wherein the voltage combiner comprises:
a second control input;
a first node coupled to a first terminal of the first voltage source;
a second node coupled to a second terminal of the first voltage source;
a third node coupled to a first terminal of the second voltage source;
a fourth node coupled to a second terminal of the second voltage source, and the second DC input of the inverter;
a fifth node coupled to the first DC input of the inverter;
a first capacitor connected between the first node and the second node;
a second capacitor connected between the second node and the fourth node;
a first diode connected between the second node and the third node;
a second diode connected between the second node and the fifth node;
a switch connected between the first node and the fifth node; and
a third diode connected between the first node and the fifth node; and
a controller coupled to the first control inputs and the second control input, the controller being configured to receive first feedback signals and second feedback signals from the inverter and the voltage combiner respectively, and configured to control current flow through the voltage combiner and the inverter.

11. A two-source series inverter system, the system comprising:
a first voltage source;
a second voltage source;
an inverter having a first DC input, a second DC input, AC outputs, and first control inputs, wherein the AC outputs are configured to be coupled to a load;
a voltage combiner connected to the first DC input and the second DC input, wherein the voltage combiner comprises:
a second control input;
a first node coupled to a first terminal of the first voltage source;
a second node coupled to a second terminal of the first voltage source;
a third node coupled to a first terminal of the second voltage source;
a fourth node coupled to a second terminal of the second voltage source, and coupled to the second DC input of the inverter;
a fifth node coupled the first DC input of the inverter;
a first capacitor connected between the first node and the second node;
a second capacitor connected between the second node and the fourth node;
a first diode connected between the second node and the third node;
a second diode connected between the second node and the fifth node;
a switch connected between the first node and the fifth node; and
a plurality of diodes each connected between the first node and one of the AC outputs respectively; and
a controller coupled to the first control inputs and the second control input, the controller being configured to receive first feedback signals and second feedback signals from the inverter and the voltage combiner respectively, and configured to control current flow through the voltage combiner and the inverter.

12. A two-source series inverter system, the system comprising:
a first voltage source;
a second voltage source;
an inverter having a first DC input, a second DC input, AC outputs, and first control inputs, wherein the AC outputs are configured to be coupled to a load;
a voltage combiner having a second control input, the voltage combiner being connected to the first DC input and the second DC input, and coupled to the first voltage source and the second voltage source, wherein the voltage combiner comprises:
a first node configured to be coupled to a first terminal of the first voltage source;
a second node configured to be coupled to a second terminal of the first voltage source;
a third node configured to be coupled to a first terminal of the second voltage source;
a fourth node configured to be coupled to a second terminal of the second voltage source and the second DC input of the inverter;
a fifth node configured to be coupled to the first DC input of the inverter;
a first diode coupled between the second node and the third node, the first diode being configured to allow current flow from the third node to the second node; and
a switch coupled between the first node and the fifth node, wherein the first voltage source and the second voltage source are connected in series when the switch is turned on; and
a controller coupled to the first control inputs and the second control input, the controller being configured to receive first feedback signals and second feedback signals from the inverter and the voltage combiner respectively, and configured to control current flow through the voltage combiner and the inverter, wherein:

a first electrical current flows from the first voltage source to the inverter through the voltage combiner; and a second electrical current flows from the second voltage source to the inverter through the voltage combiner.

* * * * *